– – –

United States Patent [19]

Bell et al.

[11] 4,042,569
[45] Aug. 16, 1977

[54] HEAT-SETTING PROCESS FOR POLYESTER FILM

[75] Inventors: Robert Glenn Bell, Florence, S.C.; Emile Gillyns, Sandweiler, Luxembourg; Olin Kilpatrick McDaniel, Jr., Florence, S.C.

[73] Assignee: E. I. Du Pont de Nemours and Company, Wilmington, Del.

[21] Appl. No.: 647,492

[22] Filed: Jan. 8, 1976

Related U.S. Application Data

[63] Continuation of Ser. No. 494,981, Aug. 5, 1974, abandoned.

[51] Int. Cl.² .................... C08G 63/12; B29D 7/24
[52] U.S. Cl. .................... 260/75 T; 264/235; 264/289; 264/346
[58] Field of Search ............. 264/288, 289, 235, 346, 264/210 R; 260/75 T

[56] References Cited

U.S. PATENT DOCUMENTS

| 2,517,570 | 8/1950 | Irons ..................................... 264/342 |
| 2,603,838 | 7/1952 | Lowry et al. ........................ 264/342 |
| 2,779,684 | 1/1957 | Alles .................................... 264/289 |
| 2,812,550 | 11/1957 | Chavannes .......................... 264/235 |
| 2,884,663 | 5/1959 | Alles .................................... 264/289 |
| 2,995,779 | 8/1961 | Winter ................................. 264/289 |
| 3,177,277 | 4/1965 | Adams et al. ...................... 264/210 R |
| 3,461,199 | 8/1969 | Campbell ............................. 264/289 |
| 3,669,931 | 6/1972 | Annis et al. ......................... 264/235 |

FOREIGN PATENT DOCUMENTS

| 235,432 | 10/1959 | Australia ............................. 264/289 |
| 1119/71 | 1/1971 | Japan |
| 1120/71 | 1/1971 | Japan |
| 922,481 | 4/1963 | United Kingdom |

*Primary Examiner* — James B. Lowe

[57] ABSTRACT

Improvement in a two-stage heat-setting process for asymmetrically, biaxially oriented polyester film wherein the film from the second heat-setting stage is heat set a third time and quenched. The starting film can be oriented by a transverse direction-machine direction sequence of drawing or a machine direction-transverse direction-machine direction sequence. The film can be machine direction drawn again after the second heat-set stage and relaxed an equal amount after the third heat-set stage. The film has improved dimensional stability in the transverse direction without a substantial loss in tensile strength at 5% elongation in the machine direction.

2 Claims, 1 Drawing Figure

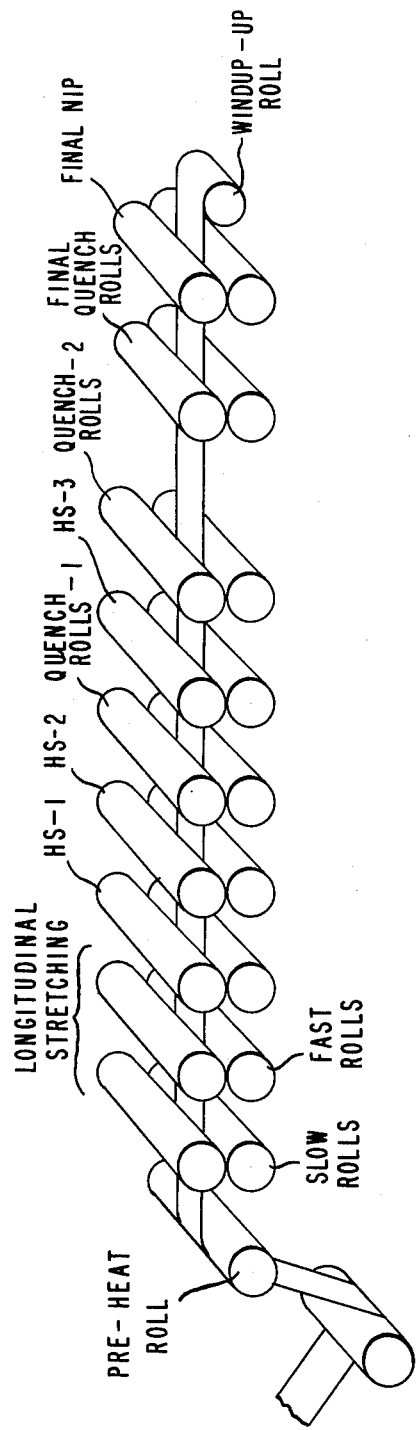

HEAT-SETTING PROCESS FOR POLYESTER FILM

BACKGROUND OF THE INVENTION

This invention relates to processing of polyester film and more particularly to the improved heat setting of such film.

Polyester film which has been oriented more in the longitudinal or machine direction (MD) than in the transverse direction (sometimes called "tensilized film") has a very high MD tensile strength as well as a high MD tensile strength measured at 5% elongation (usually known as the F-5 value). These properties have made the film very useful as a base for magnetic recording tape. It is highly desirable to produce such a film which is resistant to shrinkage at elevated temperatures, i.e., one which exhibits good thermal dimensional stability. Unfortunately, however, it has been very difficult to produce a film which has high thermal dimensional stability in the MD without some sacrifice of F-5 value since the very processes which tend to increase thermal dimensional stability simultaneously tend to create a film which permits elongation at a lower tensile force. It is also highly desirable to produce a tensilized polyester film having good thermal dimensional stability in the transverse direction (TD).

Campbell, U.S. Pat. No. 3,461,199, discloses a method for improving the MD dimensional stability of polyester film while maintaining the desirably high F-5 value. Briefly stated, the Campbell process involves two-stage heat setting after asymmmetrically biaxially stretching polyester film. The instant invention is an improvement over the Campbell process, the teachings of which patent are incorporated herein by reference.

Polyester film produced for magnetic tape base purposes is cast as a wide sheet and processed to achieve the suitable properties. Because the processing includes stretching in both the MD and in the TD, there is a tendency for the polymer molecules to be aligned in a direction somewhat askew from the MD. This phenomenon causes poor tear characteristics in the film resulting in difficulty in slitting very narrow width films. Because this phenomenon can be observed optically by birefringence measurements, it can be referred to as poor birefringence. The term "birefringence bow" is used to describe the situation wherein the birefringence at the edges of the film is different from that in the middle and varies across the width of the film.

DESCRIPTION OF THE INVENTION

This invention provides a substantial improvement in TD dimensional stability without a substantial loss in F-5 strength in the MD. Moreover, it has been found that the edge birefringence and the birefringence bow can be reduced. These improvements can be obtained in accordance with this invention which is particularly pointed out in the appended claims and is illustrated in the accompanying drawing which schematically illustrates a film being processed according to this invention and is referred to hereinafter with respect to the description of the invention.

The starting material for this invention is an asymmetrically, biaxially oriented polyester film. As used herein, the term "polyester film" means a film consisting essentially of polyethylene terephthalate (PET).

Asymmetrical biaxial orientation can be produced as follows: The film is stretched in the TD from about 3 to 4.5 times its original width, preferably about 3.3 to 4.2 times its width. This can be carried out on a conventional tenter frame as known to those skilled in the art, for example, as taught by Winter, U.S. Pat. No. 2,995,779, the teachings of which are incorporated herein by reference. Optionally, the TD stretching operation can be preceded by an MD stretching operation wherein the film is stretched up to twice its length, preferably from 1.2 to 1.5 times its length. This MD stretching can be accomplished by running the film between a pair of slow nip rolls followed by a pair of fast nip rolls both of which are heated, e.g., at about 80° C., as is well known to those skilled in the art. After the TD stretching operation, the film is passed around a preheat roll at a temperature, for example, of about 70° to 100° C. The film then passes between a pair of slow nip rolls at a temperature between about 105° and 160° C., followed by passing the film between a pair of fast nip rolls at a temperature of about 145° to 185° C. Between these sets of rolls the film is stretched at least 3.5 times its length. It is preferred that the film is stretched from about 4.3 to 4.7 times its length at this point unless the film had been previously subjected to MD stretching prior to TD stretching, in which case the preferred stretch ratio is from about 3.8 to 4.3.

As indicated schematically in the accompanying drawing, the asymmetrically, biaxially oriented film is subsequently heat set in two stages with the temperature in the first stage (HS-1) being within the range of from 150° to 250° C., preferably about 190° to 210° C. The speed of the HS-1 rolls can be such that a relaxation of the film takes place, e.g., about 2% to 5%. The second stage (HS-2) is maintained at least 5° C. below the temperature in the first stage but above the second order transition temperature for the film. Preferably, the temperature is within the range of from 155° to 190° C.

The PET film processed in accordance with this invention has not been heat set prior to entering stage HS-1, i.e., no substantial heating above the stretching temperature has taken place. It has been found that heat setting in the early stages increases the crystallinity and makes the film much more difficult to orient and it requires an excessive amount of force during processing.

The film after leaving HS-2 can be passed between a pair of quench rolls-1 where an optional first quenching can take place. The term "quenching" means taking the film below its second order transition temperature. Preferably, the quench temperature is between about 25° to 40° C. Quench rolls-1 can be run at a sufficiently greater speed than the rolls at HS-2 to effect an MD stretch within the range of from 0.5% to 6.5%.

After leaving quench rolls-1, the film is passed to a third heat-setting stage, HS-3, preferably between a pair of heated nip rolls, at a temperature of within the range of from 125° to 190° C. In one embodiment, the heat setting of the HS-3 stage can be accomplished without nip rolls by merely passing the film over the surface of a single roll, preferably with a wrap of from 150° to 200° of arc. The temperature at HS-3 can be maintained at least about 5° C. lower than the temperature at HS-2. After leaving HS-3, the film passes between a pair of quench rolls-2 wherein a quenching, preferably at about 25° to 40° takes place. The speed of quench rolls-2 can be maintained such that a relaxation within the range of from 0.5% to 6.5% in the MD takes place.

The film can then be passed, as indicated in the drawing between a final pair of quench rolls and through a final pair of nip rolls onto a windup roll.

It has been found in accordance with this invention that the dimensional stability (measured as percent shrinkage at 105° C.) in the TD can be as low as about 0.38 to 0.51. Typically, when films are similarly processed but without using this invention the TD dimensional stability ranges from about 0.7 to about 1.33. While there is some sacrifice in F-5 value (measured as MD tensile strength at 5% elongation), it is generally slight, i.e., 21,600–22,800 psi. as compared to 22,200 to 22,900 psi. for films similarly made but not using this invention. In any event, the process according to this invention can yield films with F-5 value of greater than 20,000 psi., which is usually regarded as the minimum desirable for films to be used as magnetic tape base. The MD dimensional stability of films processed in accordance with this invention does not appear to differ significantly from those not using this invention; however, on the average, there is some slight improvement. In addition, it has been found that there is an improvement in birefringence without an appreciable loss in sheet width or runability.

This invention will now be illustrated by the following example.

EXAMPLE

A 0.48-mil PET film (12 microns) is produced at a rate of about 2300 pounds per hour. The molten film is cast on a quench drum at about 24° C. and is TD stretched in a tenter frame approximately 3.9 times its width. The film is preheated in the tenter frame to 114° C. and stretched at about 107° to 110° C. After stretching, the film was passed through a zone maintained at about 92° C. The film is then stretched in the MD at about 4.60 to 4.65 times its length. The preheat roll is at 100° C., the slow roll is at 145° C. and the fast roll is at 170° C. The film is passed through HS-1 rolls maintained at 200° C. and the speed of which permits a relaxation of 4%. The film then is passed to HS-2 maintained at 180° C. After leaving HS-2, the film is passed to quench roll-1 operated at 36° C. at a speed which permits a draw of about 0.5–1%. The film is then passed to HS-3, in this example over a single roll maintained at 175° C., from which it is passed to quench roll-2 at 30° C. operated at a speed which permits a relaxation of about 0.5–1% (equivalent to the HS-2 to quench roll-1 draw). The film typically exhibits an average dimensional stability (shrinkage at 105° C.) of 0.51% TD and 1.86% MD, and an average F-5 value of about 21,800 psi.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:

1. In a process for production of an asymmetrically oriented, heat-set polyethylene terephthalale film, oriented more in the machine direction than in the transverse direction, the film having a machine direction tensile strength at 5% elongation (F5) of at least 20,000 psi (14.1 kg/mm²) and a machine direction shrinkage of not more than 2% at 105° C., by stretching the film in the transverse direction and in the machine direction, heat setting the biaxially oriented film in successive stages by contacting it in a first stage with a heat set roll at 150° to 210° C. and in a second stage with a roll at least 5° C. below the temperature of the first stage heat setting roll, but above the second order transition temperature, and thereafter contacting the film with a roll to quench it to below the second order transition temperature, the improvement comprising:

relaxing the film in the machine direction up to 2% between the first and second stage heat setting;

heat setting the film in a third stage following quenching by contacting it with a heat setting roll at the same temperature to 5° C. below the temperature of the second stage heat setting roll; then quenching the film to less than 40° C. after the third stage heat setting by contacting with a second quench roll; and relaxing the film in the machine direction from 0.5 to 6.5% between the third heat set roll and the second quench roll;

whereby a film having less than 0.7% shrinkage at 105° C. in the transverse direction and a reduced tear tendency is produced without significant loss of machine direction tensile strength at 5% elongation (F5) or increase in machine direction shrinkage.

2. An asymmetrically oriented, heat-set polyethylene terephthalate film produced by the process of claim 1.

* * * * *